(12) United States Patent
Zhang et al.

(10) Patent No.: US 12,298,014 B2
(45) Date of Patent: May 13, 2025

(54) HEATING DEVICE

(71) Applicant: GREE GREEN REFRIGERATION TECHNOLOGY CENTER CO., LTD. OF ZHUHAI, Guangdong (CN)

(72) Inventors: Long Zhang, Guangdong (CN); Bo Yu, Guangdong (CN); Yuye Luo, Guangdong (CN); Jian Zhang, Guangdong (CN)

(73) Assignee: Gree Electric Appliances, Inc. of Zhuhai, Zhuhai (CN)

( * ) Notice: Subject to any disclaimer, the term of this patent is extended or adjusted under 35 U.S.C. 154(b) by 730 days.

(21) Appl. No.: 17/439,305

(22) PCT Filed: Apr. 30, 2020

(86) PCT No.: PCT/CN2020/088246
§ 371 (c)(1),
(2) Date: Sep. 14, 2021

(87) PCT Pub. No.: WO2020/221345
PCT Pub. Date: Nov. 5, 2020

(65) Prior Publication Data
US 2022/0154948 A1      May 19, 2022

(30) Foreign Application Priority Data

Apr. 30, 2019  (CN) .......................... 201910360672.6

(51) Int. Cl.
| *F24D 13/02* | (2006.01) |
| *F24H 3/04* | (2022.01) |
| *F24H 3/12* | (2022.01) |
| *F24H 9/02* | (2006.01) |

(52) U.S. Cl.
CPC ........... *F24D 13/02* (2013.01); *F24H 3/0411* (2013.01); *F24H 3/12* (2013.01); *F24H 9/02* (2013.01); *F24D 2220/2036* (2013.01); *F24H 2250/02* (2013.01)

(58) Field of Classification Search
CPC ............. F24D 13/02; F24D 2220/2036; F24H 3/0411; F24H 3/12; F24H 9/02; F24H 2250/02
USPC ........................................................ 392/360
See application file for complete search history.

(56) References Cited

FOREIGN PATENT DOCUMENTS

| CN | 201327181 Y | * 10/2009 | ............ F24H 3/0411 |
| CN | 202177161 U | 3/2012 | |
| CN | 203223976 U | 10/2013 | |
| CN | 108253509 A | 7/2018 | |
| CN | 108759088 A | 11/2018 | |

(Continued)

OTHER PUBLICATIONS

International Search Report, with a mailing date of Jul. 12, 2017, in International application No. PCT/CN2017/079716, filed on Apr. 7, 2017.

*Primary Examiner* — Phuong T Nguyen
(74) *Attorney, Agent, or Firm* — McAndrews, Held & Malloy, Ltd.

(57) ABSTRACT

Disclosed is a heating device, including a housing, and an electrothermal film and a fan arranged in the housing, wherein the fan is located at a bottom of the electrothermal film, the fan is provided with an air inlet facing upwards and an air outlet facing forwards, and the housing is provided with a vent hole at a position corresponding to the air outlet.

16 Claims, 5 Drawing Sheets

(56) References Cited

FOREIGN PATENT DOCUMENTS

| | | | | |
|---|---|---|---|---|
| CN | 109140900 A | * | 1/2019 | ............. F24D 13/02 |
| CN | 110006093 A | | 7/2019 | |
| CN | 209877089 U | | 12/2019 | |
| GB | 2404007 A | | 1/2005 | |
| JP | 2006010156 A | | 1/2006 | |
| JP | 2008064448 A | | 3/2008 | |
| JP | 2012007812 A | | 1/2012 | |

* cited by examiner

HEATING DEVICE

CROSS-REFERENCE TO RELATED APPLICATION

The present disclosure is a national stage application of International Patent Application No PCT/CN2020/088246, which is filed on Apr. 30, 2020. The present disclosure claims priority to Chinese patent application No. 201910360672.6, filed on Apr. 30, 2019 and titled "Heating device", the disclosure of which is hereby incorporated by reference in its entirety.

TECHNICAL FIELD

The present disclosure relates to the field of heat exchange technologies, and in particular to a heating device.

BACKGROUND

Along with the improvement of people's living standards, an electric heater is widely used as a heating device. The electric heater mainly converts electric energy into heat energy through a heating element, heats an air in a specific space, and raises an ambient temperature in the entire space, so that a user in this space may feel the better ambient temperature and achieve a heating effect. For the user, the temperature felt by a body is the most direct heating experience, and it is also the most direct evaluation criterion for the heating effect of the heating device. Therefore, how to improve a temperature sensing effect of the human body surface is important.

SUMMARY

Some embodiments provide a heating device to improve a temperature sensing effect of the human body surface.

A heating device, including a housing, and an electrothermal film and a fan arranged in the housing, and the fan is located at the bottom of the electrothermal film, the fan is provided with an air inlet facing upward and an air outlet facing forward, and the housing is provided with a vent hole at a position corresponding to the air outlet.

The above scheme provides a heating device, through a synergy of the electrothermal film and the fan, a human body in front of the heating device has the better temperature sensing effect. Specifically, based on a high radiation capacity of the electrothermal film, a large amount of heat is radiated in front of the heating device, and is directly absorbed by the surface of the human body. The fan is located at the bottom of the electrothermal film, and the air outlet of the fan faces forward. While carpet-type heating is achieved, and the air flow blown out from the air outlet also pushes a large amount of heat radiated in front of the heating device forward, so the temperature sensing effect of the human body in front of the heating device is overall improved.

In some embodiments, there are a plurality of electrothermal films, the plurality of electrothermal films are successively arranged in the housing at intervals, and the plurality of electrothermal films are distributed horizontally.

In some embodiments, an emissivity of the electrothermal film is 0.9.

In some embodiments, the fan includes a cross-flow fan, an axis of the cross-flow fan is arranged along a transverse direction of the housing, and an air outlet of the cross-flow fan faces forward.

In some embodiments, a highest point of the vent hole in a longitudinal direction of the housing is located between a highest point of the cross-flow fan and a lowest point of the electrothermal film, a height of the vent hole in the longitudinal direction of the housing is not less than a diameter of the cross-flow fan, and a length of the vent hole in a transverse direction of the housing is not less than a length of the cross-flow fan in an axial direction.

In some embodiments, the housing includes a front plate, and the vent hole is arranged at a position, corresponding to the cross-flow fan, on the front plate, a ventilation grille is arranged at the vent hole, blades of the ventilation grille are arranged along the transverse direction of the housing, and two ends of the blades are rotatably connected with the housing, or the vent hole is formed by a plurality of strip-shaped holes arranged at intervals, and the plurality of the strip-shaped holes are arranged at intervals in the longitudinal direction of the housing.

In some embodiments, a distance between rotating shafts of two adjacent blades in the ventilation grille is 5 mm-10 mm.

In some embodiments, the housing includes a front plate, the vent hole is arranged at a position, corresponding to the fan, of the front plate, and a position, corresponding to the electrothermal film, of the front plate is a radiation position, the radiation position is provided with a plurality of heat conducting holes, and the plurality of heat conducting holes are evenly distributed at the radiation position at intervals.

In some embodiments, each of the plurality of heat conducting holes is a diamond-shaped hole or a round hole.

In some embodiments, the housing includes a front plate, the vent hole is arranged at a position, corresponding to the fan, of the front plate, a position, corresponding to the electrothermal film, of the front plate is a radiation position, and the radiation position is a heat-permeable plate.

In some embodiments, the housing includes an upper plate, the upper plate is provided with a plurality of upper air suction ports, the housing includes a back plate, and an upper end of the back plate is provided with a plurality of rear air suction ports.

In some embodiments, the housing includes an upper plate, the upper plate is provided with a plurality of upper air suction ports, or the housing includes a back plate, and an upper end of the back plate is provided with a plurality of rear air suction ports.

In some embodiments, the housing includes a frame structure surrounded by an upper plate, a bottom plate and two side plates, or the housing is surrounded by an upper plate, a bottom plate, a front plate, a back plate and two side plates, and the vent hole is arranged at a position, corresponding to an air outlet of the fan, of the front plate.

BRIEF DESCRIPTION OF THE DRAWINGS

Implementation modes of a heating device of the present disclosure are described below with reference to drawings. In the drawing.

DESCRIPTION OF REFERENCE SIGNS

10. Heating device, 11. Housing, 111. Front plate, 1111. Vent hole, 1112. Heat conducting hole, 112. Upper plate, 1121. Upper air suction port, 113. Back plate, 1131. Rear air suction port, 114. Side plate, 12. Electrothermal film, 13. Fan, and 14. Blade.

DETAILED DESCRIPTION OF THE EMBODIMENTS

In order to make the above objectives, features, and advantages of the present disclosure more apparent and understandable, specific implementation modes of the present disclosure are described in detail below with reference to drawings. In the following description, many specific details are described in order to fully understand the present disclosure. However, the present disclosure may be implemented in many other ways different from those described herein, and those skilled in the art may make similar improvements without violating the connotation of the present disclosure. Therefore, the present disclosure is not limited by the specific implementation disclosed below.

It should be noted that while an element is referred to as being "fixed to" another element, it may be directly on the other element or an intermediate element may also be existent. While an element is considered to be "connected" to another element, it may be directly connected to the other element or an intermediate element may be existent at the same time. Terms "vertical", "horizontal", "left", "right" and similar expressions used herein are for illustrative purposes only, and do not mean that they are the only implementation modes.

Unless otherwise defined, all technical and scientific terms used herein have the same meaning as commonly understood by those skilled in the art of the present disclosure. Terminologies used in the description of the present disclosure herein are only for the purpose of describing the specific embodiments, and are not intended to limit the present disclosure. The technical features of the above embodiments may be combined arbitrarily. In order to make the description concise, all possible combinations of the various technical features in the above embodiments are not described. However, as long as there is no contradiction in the combinations of these technical features, it should be considered as a scope recorded in the description.

Figure 1:
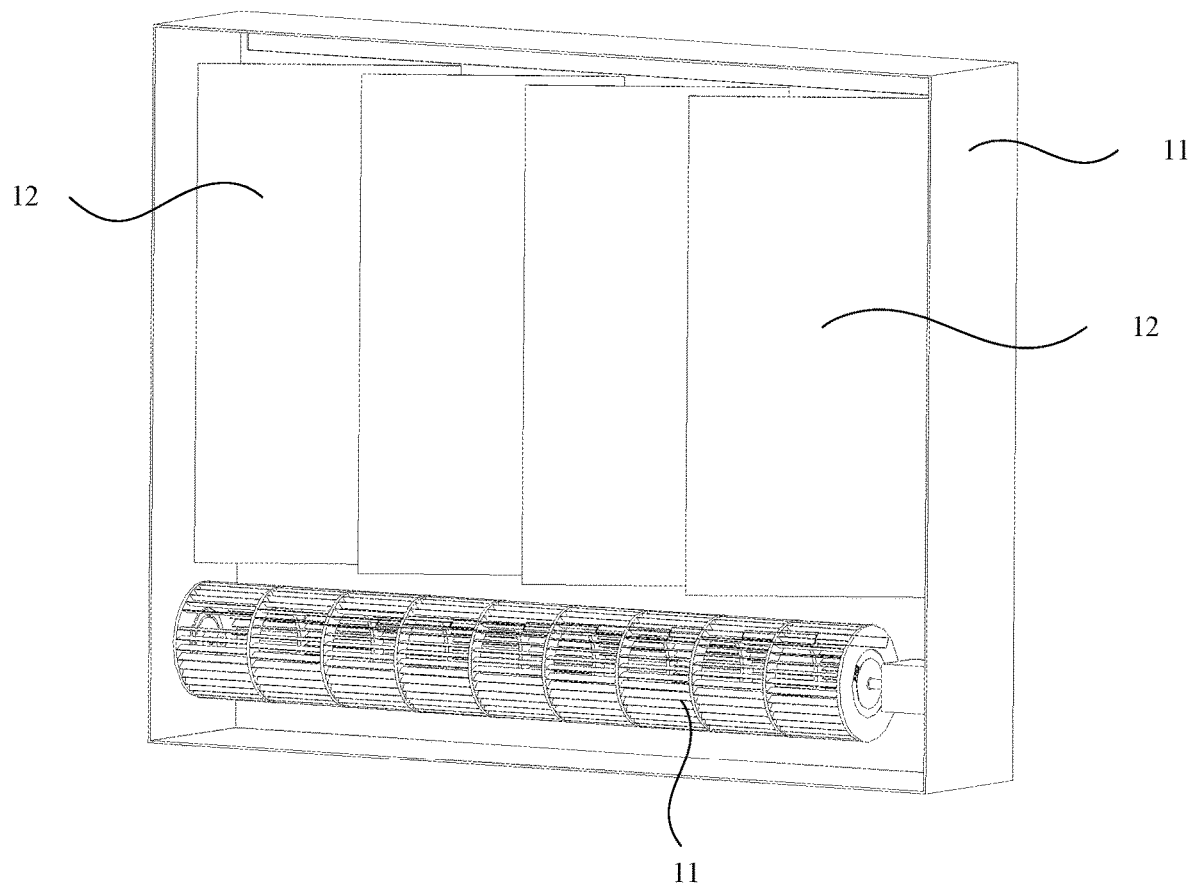
FIG. 1 illustrates a structure schematic diagram of the arrangement of an electrothermal film and a fan in the heating device according to an embodiment.
Figure 2:
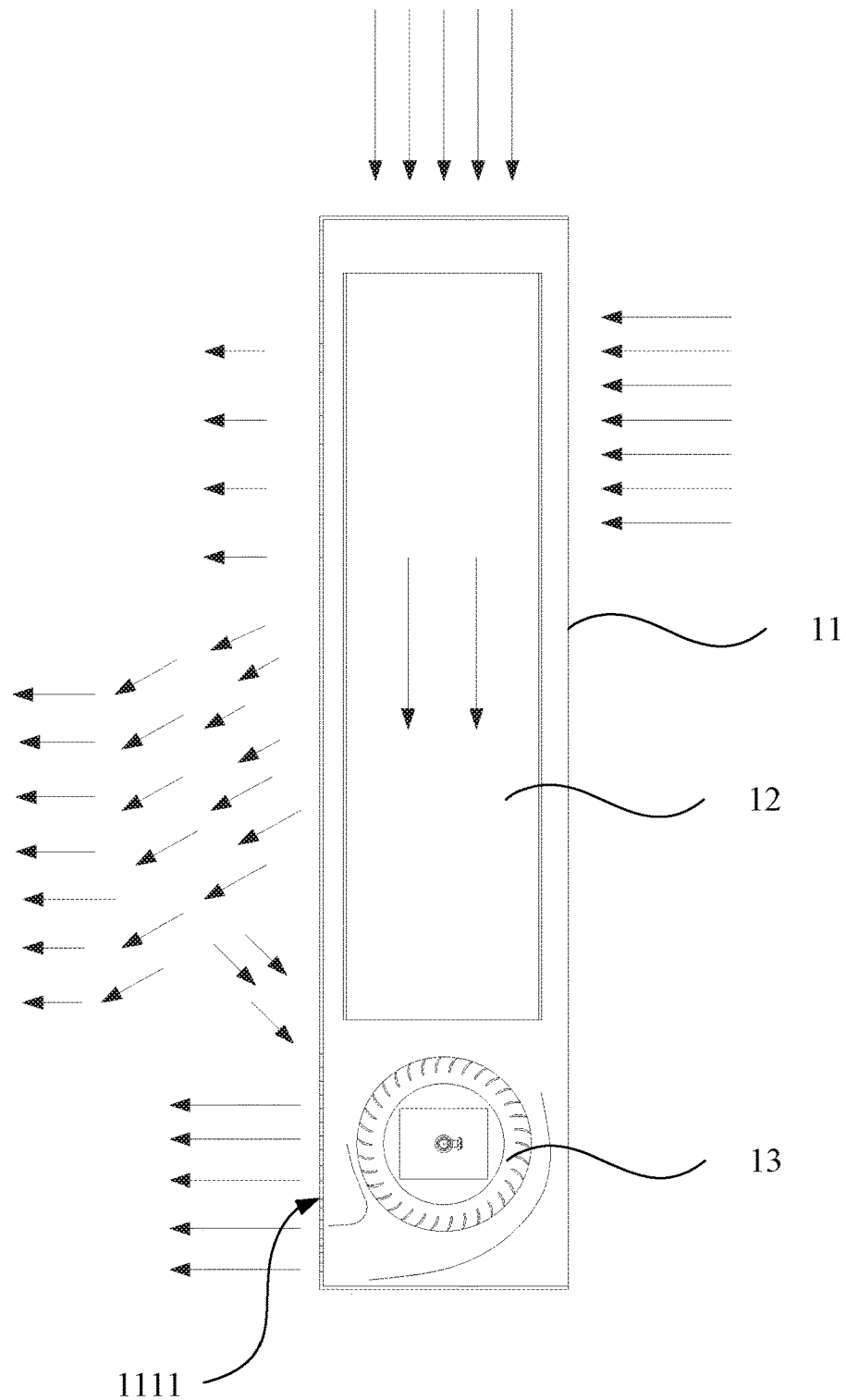
FIG. 2 illustrates a schematic diagram of a surrounding air flow state while the heating device in this embodiment is used.

As shown in FIG. 1 and FIG. 2, in some embodiments, a heating device 10 is provided, the heating device 10 includes a housing 11, and an electrothermal film 12 and a fan 13 arranged in the housing 11, and the fan 13 is located at a bottom of the electrothermal film 12, the fan 13 has an air inlet facing upward and an air outlet facing forward, and the housing 11 is provided with a vent hole 1111 at a position corresponding to the air outlet.

In use, through the synergy of the electrothermal film 12 and the fan 13, a human body in front of the heating device 10 has a better temperature sensing effect. In some embodiments, as shown in FIG. 2, based on the high radiation capacity of the electrothermal film 12, a large amount of heat is radiated in front of the heating device 10. The fan 13 is located at the bottom of the electrothermal film 12, and the air outlet of the fan 13 faces forward. While carpet-type heating is achieved, and an air flow blown out from the air outlet also pushes the large amount of heat radiated in front of the heating device 10 forward, as shown in FIG. 2, so the temperature at a near-ground position in front of the heating device 10 is higher, and the temperature sensing effect of the human body in front of the heating device 10 is overall improved.

Figure 3:
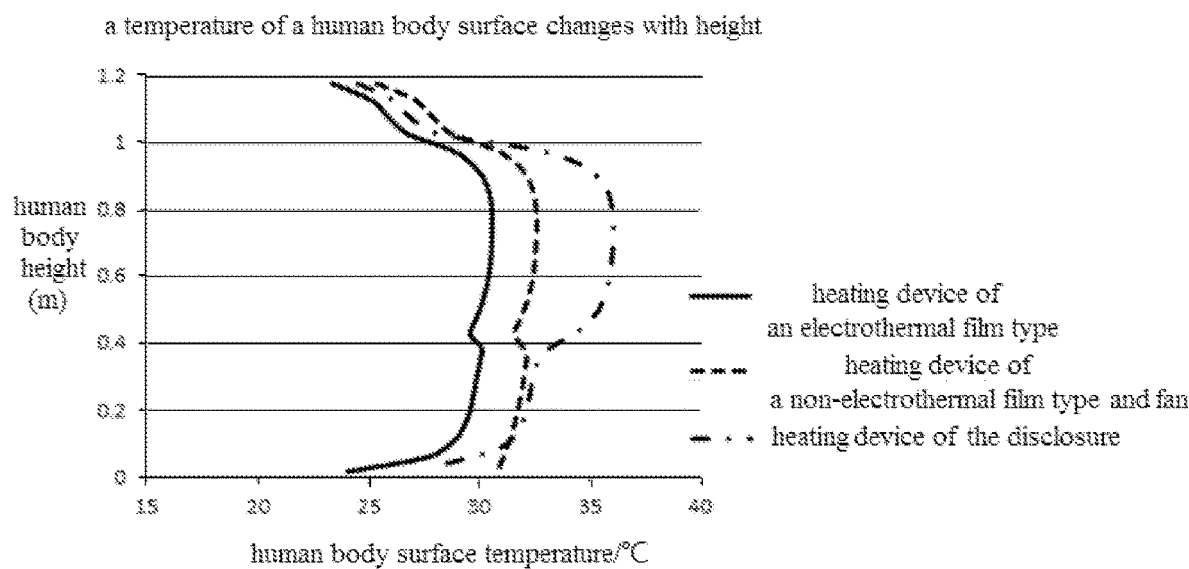
FIG. 3 illustrates a comparison chart of a change of a human body surface temperature with the height while the different heating devices are used.

As shown in FIG. 3, compared to a heating device of a non-electrothermal film type, even if the heating device of the non-electrothermal film type is equipped with a fan for carpet-type heating, there is no a large amount of heat that is pushed forward, because there is no electric heating film that radiates a lot of the heat to the front of the heating device. Therefore, the above effect of improving the human body temperature sensing does not be achieved. As shown in FIG. 3, in a range of a human body height from 1 m to 0.4 m, compared with the heating device of the non-electrothermal film type, even if the fan is installed, it may not achieve the temperature that the heating device 10 in some embodiments of the present disclosure achieves in the case without a large amount of the heat that is pushed forward. The heating device in a pure electric heating mode only supplies heat through radiation and natural convection, but based on the rise of natural convection heat, it may not achieve the human body temperature sensing effect that the heating device 10 described in the present disclosure achieves.

Figure 4:
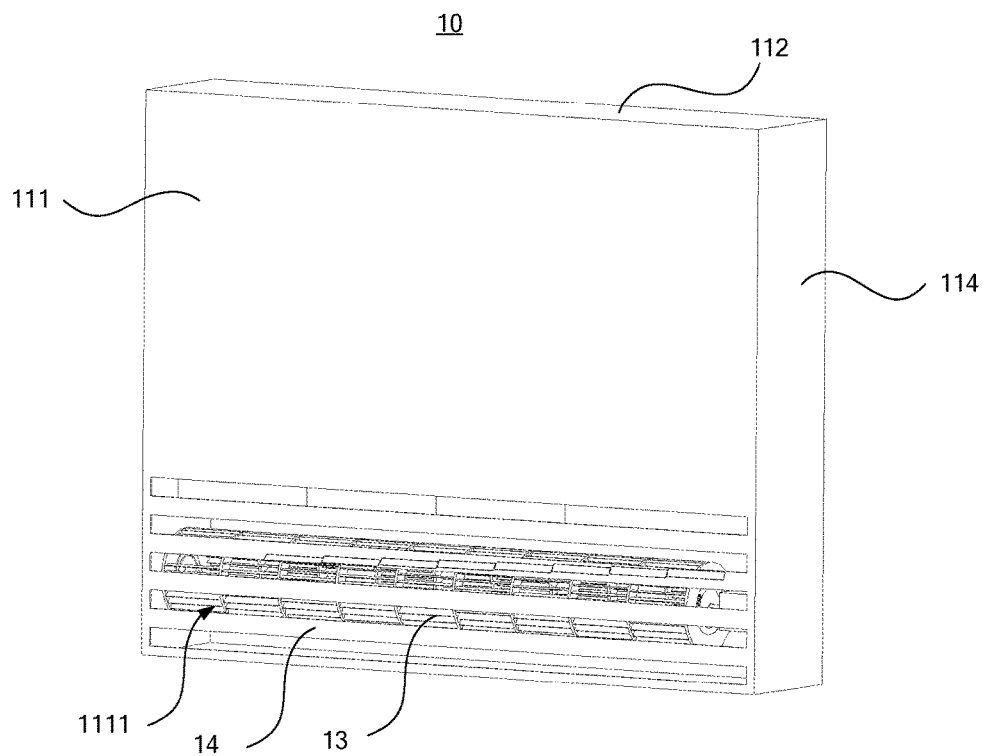
FIG. 4 illustrates a structure schematic diagram of a heating device shown in another embodiment.

In some embodiments, as shown in FIG. 1, the housing 11 includes a frame structure surrounded by an upper plate 112, a bottom plate and two side plates 114, and the electrothermal film 12 and the fan 13 are arranged in the frame structure enclosed by the housing 11; or as shown in FIG. 4, the housing 11 is surrounded by an upper plate 112, a bottom plate, a front plate 111, a back plate 113 and two side plates 114, the electrothermal film 12 and the fan 13 are protected by the housing 11 to avoid accidental touch from the outside. Or the housing 11 may be of other frame structures, as long as it is able to support and fix the electrothermal film 12 and the fan 13.

In some embodiments, as shown in FIG. 2, and FIG. 4 to FIG. 6, the housing 11 includes a front plate 111, and the front plate 111 described here is a baffle that is contained in the housing and located in front of the electrothermal film 12 and the fan 13, the vent hole 1111 is arranged at a position, corresponding to the fan 13, of the front plate 111. While the housing 11 does not include the front plate 111, and the air outlet of the fan 13 is not shielded by an object, the housing 11 is naturally enclosed to form an opening, and the vent hole is a part of the opening.

In some embodiments, while the housing 11 includes a front plate 111, as shown in FIG. 2, and FIG. 4 to FIG. 6, a ventilation grille is arranged at the vent hole 1111. Furthermore, blades 14 of the ventilation grille are set in a rotating form, to adjust a direction of wind blown out from the ventilation grille. In some embodiments, the blades 14 of the ventilation grille are arranged along a transverse direction of the housing 11, and two ends of the blades 14 are rotatably connected with the housing 11, so that an angle of the blades 14 is adjusted.

In some embodiments, the vent hole 1111 is formed by a plurality of strip-shaped holes arranged at intervals, and the plurality of the strip-shaped holes are arranged at intervals in a longitudinal direction of the housing 11.

In some embodiments, a distance between rotating shafts of two adjacent blades 14 in the ventilation grille is 5 mm-10 mm.

In some embodiments, the fan 13 is a cross-flow fan or a fan 13 of other forms, and it is not specifically limited here.

As shown in FIG. 1, FIG. 2 and FIG. 4 to FIG. 6, while the fan 13 is a cross-flow fan, an axis of the cross-flow fan is arranged along the transverse direction of the housing 11, and an air outlet of the cross-flow fan faces forward. In this way, a heat-exchanged air in the housing 11 is better blown out to form a carpet-type heating effect.

In some embodiments, while the fan 13 is a cross-flow fan, in order to improve the overall ventilation effect, a length of the each vent hole 1111 in the transverse direction of the housing 11 is not less than a length in an axial direction of the cross-flow fan. Naturally, while the vent hole 1111 is provided with a ventilation grille, a length of a blade 14 of the ventilation grille in the transverse direction of the housing 11 is not less than the length in the axial direction of the cross-flow fan.

In the longitudinal direction of the housing 11, a highest point of the vent hole 1111 is located between a highest point of the cross-flow fan and a lowest point of the electrothermal film 12, and a height of the vent hole 1111 in the longitudinal direction of the housing 11 is not less than a diameter of the cross-flow fan, namely a lowest point of the vent hole 1111 is not higher than a lowest point of the cross-flow fan, a purpose is guaranteed that the vent hole 1111 conducts air to the cross-flow fan.

Figure 5:
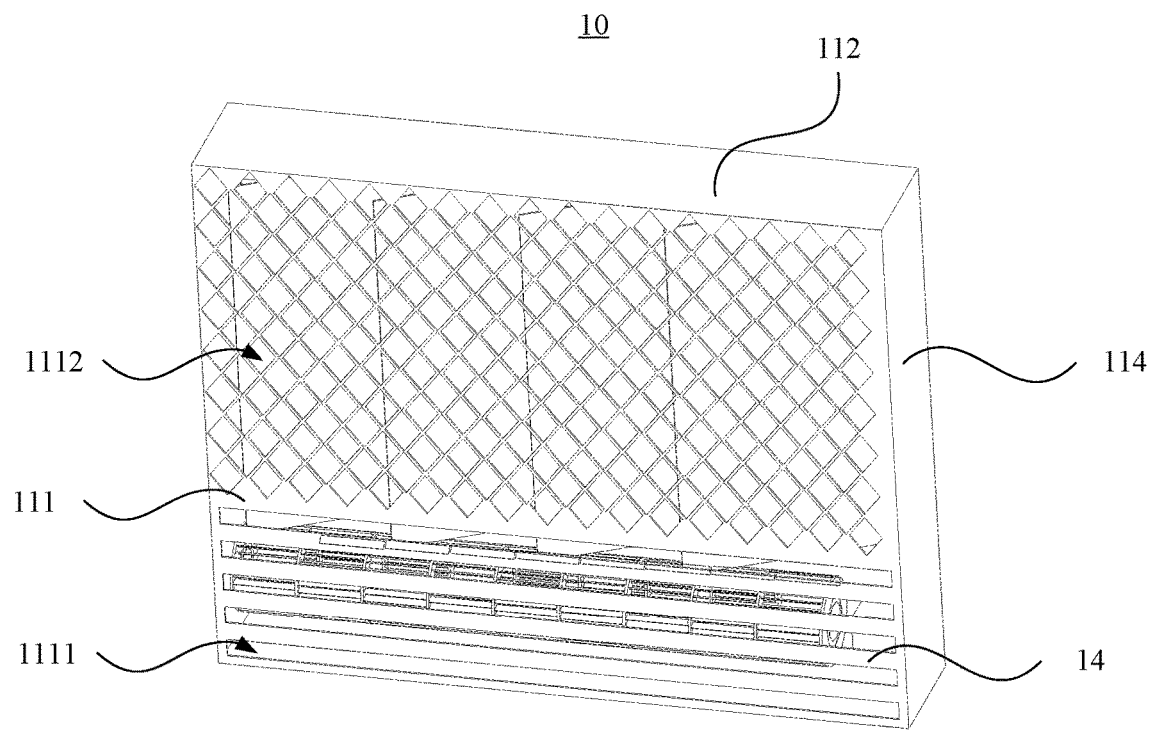
FIG. 5 and FIG. 6 are structure schematic diagrams of the corresponding heating devices while heat conducting holes have two different shapes.
Figure 6:
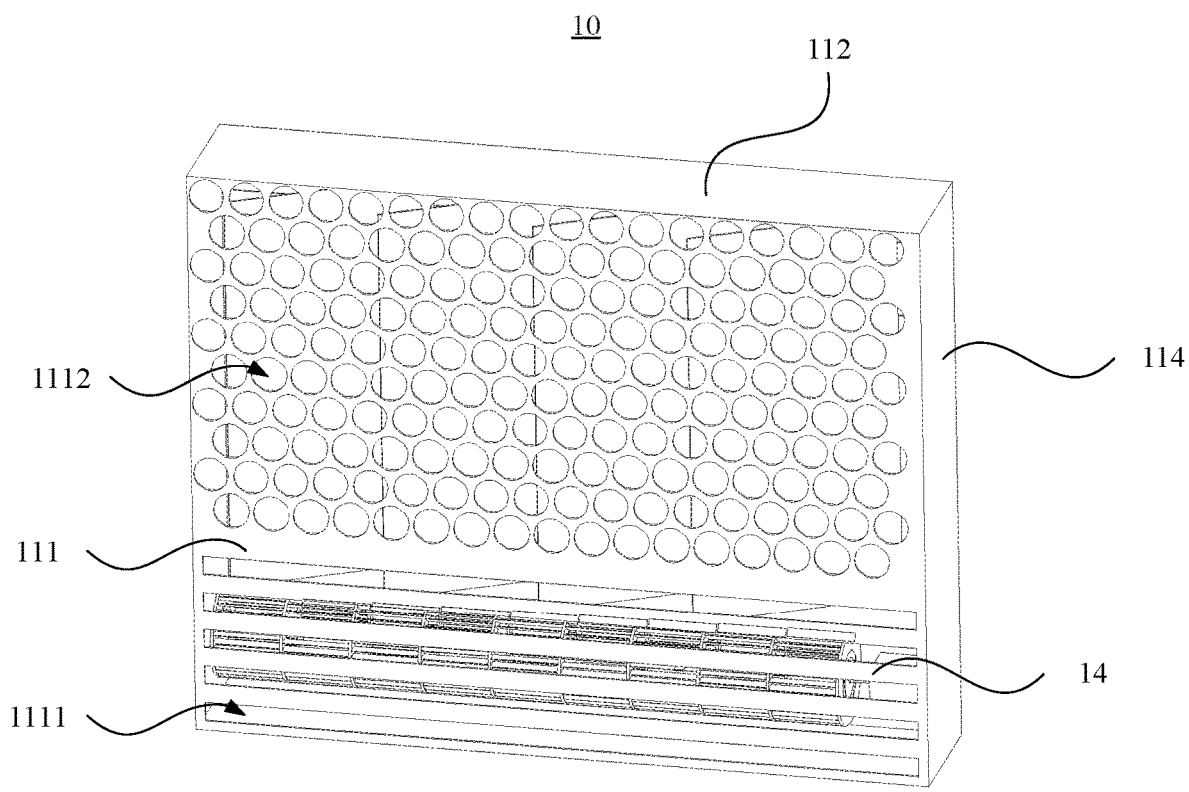

In some embodiments, as shown in FIG. 1, FIG. 5 and FIG. 6, there is a plurality of electrothermal films 12, the plurality of the electrothermal films 12 is successively arranged at intervals in the housing 11, and the plurality of the electrothermal films 12 is distributed horizontally, a radiated heat is directly absorbed by a surface of a human body. A heat exchange space is formed in the housing 11, and an air entering the heat exchange space in the housing 11 exchanges heat with the electrothermal films 12, as shown in FIG. 2, the heat-carrying air is absorbed by the fan 13, and then discharged from the air outlet of the fan 13. The fan 13 discharges the heated air to achieve the carpet-type heating while a large amount of the heat radiated by the electrothermal films 12 is pushed forward.

In some embodiments, the electrothermal film 12 here is a film with high emissivity. In some embodiments, the emissivity of the electrothermal film 12 is 0.9.

In some embodiments, as shown in FIG. 5 and FIG. 6, the housing 11 includes a front plate 111, the vent holes 1111 are arranged at a position, corresponding to the fan 13, on the front plate 111, and a position, corresponding to the electrothermal film 12, on the front plate 111 is a radiation position, the radiation position is provided with a plurality of heat conducting holes 1112, and the heat generated by the electrothermal film 12 is radiated forward through the heat conducting holes 1112.

In some embodiments, the plurality of heat conducting holes 1112 is evenly distributed at intervals at the radiation position. Specifically, as shown in FIG. 5 and FIG. 6, the heat conducting hole 1112 is a diamond-shaped hole or a round hole. In some embodiments, the heat conducting hole 1112 may also be a hole of other shapes, it is not specifically limited here.

In some embodiments, as shown in FIG. 4, the radiation position on the front plate 111 does not provided with the heat conducting hole 1112, and the radiation position is manufactured by a plate that is easily penetrated by heat, a heat-penetrable plate is formed, only if it is sufficient to ensure that the heat generated by the electrothermal film 12 is radiated forward.

Figure 7:
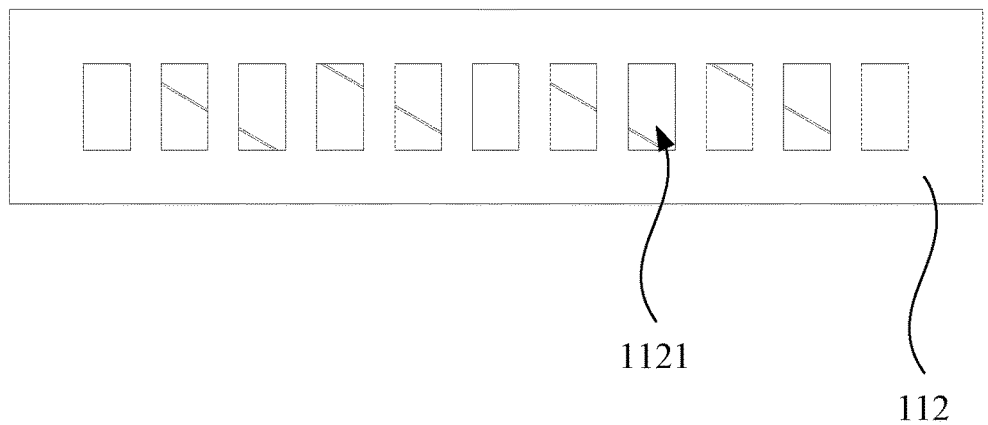
FIG. 7 illustrates a top view of the heating device in an embodiment.

As shown in FIG. 7, in some embodiments, the housing 11 includes an upper plate 112, and the upper plate 112 is provided with a plurality of upper air suction ports 1121. During a using process, as shown in FIG. 2, outside air enters the housing 11 from the upper air suction ports 1121 for heat exchange. In some embodiments, the plurality of the upper air suction ports 1121 are evenly distributed at intervals on the upper plate 112.

Figure 8:
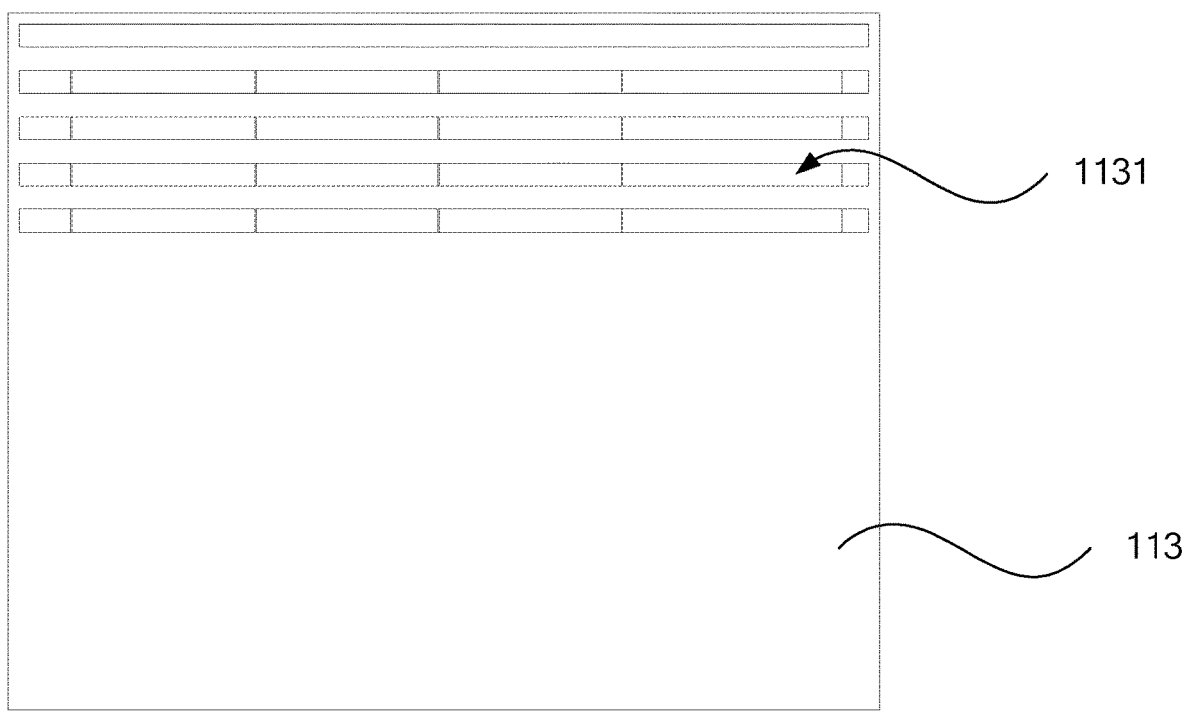
FIG. 8 illustrates a rear view of the heating device in an embodiment.

In some embodiments, as shown in FIG. 8, the back plate 113 of the housing 11 is provided with a plurality of rear air suction ports 1131, as to achieve a purpose that the outside air enters into the housing 11.

Specifically, as shown in FIG. 8, the plurality of the rear air suction ports 1131 is located at an upper end of the back plate 113, so that the outside air entering into the housing 11 is better exchange heat with the electrothermal film 12 and then flow downwards, and it is blown out by the fan 13.

Technical features of the above embodiments are combined arbitrarily. In order to make the description concise, all possible combinations of the various technical features in the above embodiments are not described. However, as long as there is no contradiction in the combinations of these technical features, it should be considered as the scope recorded in the description.

The above embodiments only express several implementation modes of the present disclosure, and the descriptions thereof are relatively specific and detailed, but they should not be understood as limiting a scope of the patent disclosure. It should be pointed out that for those of ordinary skill in the art, several modifications and improvements may be made without departing from the concept of the present disclosure, and these all fall within a scope of protection of the present disclosure. Therefore, the scope of protection of the patent in the present disclosure shall be subject to the appended claims.

What is claimed is:

1. A heating device, comprising a housing, and an electrothermal film and a fan arranged in the housing, wherein the fan is located at a bottom of the electrothermal film, the fan is provided with an air inlet facing upward and an air outlet facing forward, and the housing is provided with a vent hole at a position corresponding to the air outlet;

wherein the fan comprises a cross-flow fan, an axis of the cross-flow fan is arranged along a transverse direction of the housing, and an air outlet of the cross-flow fan faces forward; the housing comprises a front plate, and the vent hole is arranged at a position, corresponding to the cross-flow fan, on the front plate, a ventilation grille is arranged at the vent hole, blades of the ventilation grille are arranged along the transverse direction of the housing, and two ends of the blades are rotatably connected with the housing, or the vent hole is formed by a plurality of strip-shaped holes arranged at intervals, and the plurality of the strip-shaped holes are arranged at intervals in the longitudinal direction of the housing.

2. The heating device according to claim 1, wherein there are a plurality of electrothermal films, the plurality of electrothermal films are successively arranged in the housing at intervals, and the plurality of electrothermal films are distributed horizontally.

3. The heating device according to claim 2, wherein a position, corresponding to the electrothermal film, of the front plate is a radiation position, the radiation position is provided with a plurality of heat conducting holes, and the plurality of heat conducting holes are evenly distributed at the radiation position at intervals.

4. The heating device according to claim 2, wherein a position, corresponding to the electrothermal film, on the front plate is a radiation position, and the radiation position is a heat-permeable plate.

5. The heating device according to claim 1, wherein an emissivity of the electrothermal film is 0.9.

6. The heating device according to claim 5, wherein a position, corresponding to the electrothermal film, of the front plate is a radiation position, the radiation position is provided with a plurality of heat conducting holes, and the plurality of heat conducting holes are evenly distributed at the radiation position at intervals.

7. The heating device according to claim 5, wherein a position, corresponding to the electrothermal film, on the front plate is a radiation position, and the radiation position is a heat-permeable plate.

8. The heating device according to claim 1, wherein a highest point of the vent hole in a longitudinal direction of the housing is located between a highest point of the cross-flow fan and a lowest point of the electrothermal film, a height of the vent hole in the longitudinal direction of the housing is not less than a diameter of the cross-flow fan, and a length of the vent hole in the transverse direction of the housing is not less than a length of the cross-flow fan in an axial direction.

9. The heating device according to claim 8, wherein a position, corresponding to the electrothermal film, of the front plate is a radiation position, the radiation position is provided with a plurality of heat conducting holes, and the plurality of heat conducting holes are evenly distributed at the radiation position at intervals.

10. The heating device according to claim 1, wherein a distance between rotating shafts of two adjacent blades in the ventilation grille is 5 mm-10 mm.

11. The heating device according to claim 1, wherein a position, corresponding to the electrothermal film, of the front plate is a radiation position, the radiation position is provided with a plurality of heat conducting holes, and the plurality of heat conducting holes are evenly distributed at the radiation position at intervals.

12. The heating device according to claim 11, wherein each of the plurality of heat conducting holes is a diamond-shaped hole or a round hole.

13. The heating device according to claim 1, wherein a position, corresponding to the electrothermal film, on the front plate is a radiation position, and the radiation position is a heat-permeable plate.

14. The heating device according to claim 1, wherein the housing comprises an upper plate, the upper plate is provided with a plurality of upper air suction ports, the housing comprises a back plate, and an upper end of the back plate is provided with a plurality of rear air suction ports.

15. The heating device according to claim 1, wherein the housing comprises an upper plate, the upper plate is provided with a plurality of upper air suction ports, or the housing comprises a back plate, and an upper end of the back plate is provided with a plurality of rear air suction ports.

16. The heating device according to claim 1, wherein the housing is surrounded by an upper plate, a bottom plate, the front plate, a back plate and two side plates, and the vent hole is arranged at a position, corresponding to an air outlet of the fan, of the front plate.

* * * * *